United States Patent
Febrer et al.

(10) Patent No.: US 8,918,259 B2
(45) Date of Patent: Dec. 23, 2014

(54) METHOD OF MANAGING A DEVICE THAT SPLITS DRIVE TORQUE BETWEEN THE FRONT AND REAR WHEELSET OF A VEHICLE

(75) Inventors: Pascal Febrer, Paris (FR); Francois Foussard, Versailles (FR); Stephane Guegan, Versailles (FR); Alessandro Monti, La Garenne Colombes (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 172 days.

(21) Appl. No.: 13/640,318

(22) PCT Filed: Apr. 11, 2011

(86) PCT No.: PCT/FR2011/050820
§ 371 (c)(1),
(2), (4) Date: Nov. 28, 2012

(87) PCT Pub. No.: WO2011/128564
PCT Pub. Date: Oct. 20, 2011

(65) Prior Publication Data
US 2013/0096794 A1    Apr. 18, 2013

(30) Foreign Application Priority Data

Apr. 12, 2010 (FR) ...................................... 10 52776

(51) Int. Cl.
  *F16D 25/00* (2006.01)
  *B60W 10/119* (2012.01)
  *B60K 17/34* (2006.01)
  *B60K 23/08* (2006.01)
  *F16D 48/06* (2006.01)

(52) U.S. Cl.
  CPC .............. *B60W 10/119* (2013.01); *B60K 17/34* (2013.01); *B60K 23/08* (2013.01);
(Continued)

(58) Field of Classification Search
None
See application file for complete search history.

(56) References Cited

U.S. PATENT DOCUMENTS 5,518,464 A * 5/1996 Teraoka ........................ 475/252
5,563,784 A * 10/1996 Miener .......................... 701/51
(Continued)

FOREIGN PATENT DOCUMENTS

EP    1 749 725    2/2007
FR    2 744 072    8/1997
(Continued)

OTHER PUBLICATIONS

French Search Report Issued Dec. 15, 2010 in FR 1052776 Filed Apr. 12, 2011.

(Continued)

*Primary Examiner* — Thomas Tarcza
*Assistant Examiner* — Richard Goldman
(74) *Attorney, Agent, or Firm* — Oblon, Spivak, McClelland, Maier & Neustadt, L.L.P.

(57) ABSTRACT

A splitting of drive torque between front and rear wheelsets includes an actuator to split the torque between the wheelsets, an electronic unit controlling switching of the actuator into a coupled or uncoupled mode, a mechanism electrically powering the electronic unit, and sensors. The electronic unit can make the system adopt: an active operation in which a control signal is generated and the temperature of the actuator is estimated; and a sleep mode in which the temperature of the actuator is not estimated; the switch to sleep mode being authorized: only when the engine is stopped, and if the actuator temperature is below or equal to a threshold or a maximum time period has elapsed.

16 Claims, 2 Drawing Sheets

(52) U.S. Cl.
CPC ............ *B60K 23/0808* (2013.01); *F16D 48/06* (2013.01); *B60W 2510/0241* (2013.01); *B60W 2510/0291* (2013.01); *B60W 2550/12* (2013.01); *B60W 2720/403* (2013.01); *F16D 2500/10431* (2013.01); *F16D 2500/30405* (2013.01); *F16D 2500/3069* (2013.01); *F16D 2500/3122* (2013.01); *F16D 2500/5102* (2013.01)
USPC ................ 701/67; 701/68; 701/69; 180/243; 180/248; 180/249

(56) References Cited

U.S. PATENT DOCUMENTS

| | | | | |
|---|---|---|---|---|
| 5,752,211 | A * | 5/1998 | Takasaki et al. | 701/69 |
| 5,803,197 | A * | 9/1998 | Hara et al. | 180/248 |
| 5,813,490 | A * | 9/1998 | Takasaki et al. | 180/250 |
| 5,927,425 | A * | 7/1999 | Kusano | 180/248 |
| 6,006,149 | A * | 12/1999 | Salecker et al. | 701/51 |
| 6,070,685 | A * | 6/2000 | Takasaki et al. | 180/250 |
| 6,145,614 | A * | 11/2000 | Kimura et al. | 180/248 |
| 7,054,732 | B2 * | 5/2006 | Rieger et al. | 701/67 |
| 7,533,754 | B2 * | 5/2009 | Burrows et al. | 180/248 |
| 7,581,612 | B2 * | 9/2009 | Shigeta et al. | 180/233 |
| 7,630,812 | B2 * | 12/2009 | Jiang et al. | 701/68 |
| 8,055,426 | B2 * | 11/2011 | Nam et al. | 701/86 |
| 8,224,537 | B2 * | 7/2012 | Olsson et al. | 701/51 |
| 8,225,898 | B2 * | 7/2012 | Kuwabara et al. | 180/233 |
| 8,229,640 | B2 * | 7/2012 | Shigeta et al. | 701/72 |
| 8,257,222 | B2 * | 9/2012 | Silveri et al. | 477/3 |
| 8,688,293 | B2 * | 4/2014 | Douzane et al. | 701/1 |
| 2003/0144109 | A1 * | 7/2003 | Gradu | 475/329 |
| 2003/0150685 | A1 * | 8/2003 | Iida et al. | 192/82 T |
| 2004/0050599 | A1 * | 3/2004 | Krzesicki et al. | 180/65.3 |
| 2006/0108166 | A1 * | 5/2006 | Tanaka et al. | 180/248 |
| 2006/0169516 | A1 * | 8/2006 | Masuya et al. | 180/246 |
| 2007/0029126 | A1 * | 2/2007 | Shigeta et al. | 180/247 |
| 2007/0034428 | A1 * | 2/2007 | Janson | 180/65.3 |
| 2007/0151790 | A1 * | 7/2007 | Thompson et al. | 180/247 |
| 2008/0026898 | A1 * | 1/2008 | Supina et al. | 475/5 |
| 2008/0196952 | A1 * | 8/2008 | Soliman et al. | 180/65.2 |
| 2008/0196953 | A1 * | 8/2008 | Soliman et al. | 180/65.2 |
| 2008/0196954 | A1 * | 8/2008 | Soliman et al. | 180/65.2 |
| 2008/0196962 | A1 * | 8/2008 | Capito | 180/249 |
| 2010/0076637 | A1 * | 3/2010 | Ueoka | 701/22 |
| 2011/0166760 | A1 * | 7/2011 | Kiessner-Haiden | 701/68 |
| 2012/0253602 | A1 * | 10/2012 | Fujita et al. | 701/41 |
| 2013/0054105 | A1 * | 2/2013 | Febrer et al. | 701/69 |
| 2013/0066531 | A1 * | 3/2013 | Boutron et al. | 701/69 |
| 2013/0075183 | A1 * | 3/2013 | Kochidomari et al. | 180/292 |
| 2013/0096794 | A1 * | 4/2013 | Febrer et al. | 701/69 |
| 2013/0151057 | A1 * | 6/2013 | Matsubara et al. | 701/22 |
| 2013/0220722 | A1 * | 8/2013 | Mita | 180/249 |

FOREIGN PATENT DOCUMENTS

| | | |
|---|---|---|
| WO | 2009 129280 | 10/2009 |
| WO | 2009 146816 | 12/2009 |

OTHER PUBLICATIONS

International Search Report Issued Aug. 8, 2011 in PCT/FR11/050820 Filed Apr. 11, 2011.

* cited by examiner

METHOD OF MANAGING A DEVICE THAT SPLITS DRIVE TORQUE BETWEEN THE FRONT AND REAR WHEELSET OF A VEHICLE

The present invention relates, generally, to the field of the control of a device for distributing the engine torque between the front and rear wheel sets of a vehicle.

More particularly, the invention relates to a method for managing a device for distributing the engine torque between the front and rear wheel sets of a vehicle, said distribution device comprising:
- an electromechanical actuator for distributing said engine torque between said sets, the actuator being designed to selectively adopt a mechanical coupling configuration of the sets and a mechanical decoupling configuration of the sets;
- an electronic unit for controlling said actuator provided with a memory and designed to control, by at least one actuator control signal, the switching of said actuator to at least one of said coupling and decoupling configurations;
- an electrical power supply means of said electronic control unit;
- a plurality of sensors, designed to transmit to the control unit a plurality of sensor signals, including at least an ignition signal representative of the operation of the engine and a stop signal representative of the stopping of the engine and measurements of physical parameters such as the temperature of the ambient air.

BACKGROUND

The actuator for distributing engine torque between the front set and the rear set of the vehicle has a tendency to overheat when it is being used to transmit the torque from the engine to the sets and between the sets, and in particular when the distribution of the torque between the sets is varied via the configuration change command from the actuator.

This overheating presents a risk to the integrity of the actuator and of the vehicle as well as to the vehicle usage safety and can cause the operation of the actuator to be degraded.

In this context, the aim of the present invention is to propose a method for managing a device for distributing the engine torque between the front and rear wheel sets of a vehicle that makes it possible on the one hand to estimate the temperature of the actuator while limiting the costs associated with this temperature estimation function and that also makes it possible to minimize the energy consumption linked to this temperature estimation function.

BRIEF SUMMARY

To this end, the method of the invention, which otherwise conforms to the generic definition given to by the preamble defined previously, is essentially characterized in that the electronic control unit is designed:
- to adopt an active operating mode in which the control unit generates at least one said control signal for said actuator and, using at least some of said measurements of physical parameters, estimates a current actuator temperature value; and
- to adopt a sleep mode in which the control unit retains information in memory and in which the control unit does not generate said at least one actuator control signal and does not estimate the current actuator temperature value, the electrical energy consumption of the electronic control unit being significant in active operating mode compared to that in sleep mode; and
in that the switchover from the active operating mode to the sleep mode is authorized by said control unit:
  - only when the contact is severed, and
  - if said current estimated actuator temperature value is less than or equal to a given temperature threshold or a maximum time has passed.

The actuator makes it possible to distribute the engine torque to the sets according to the operating need of the vehicle with two drive wheels or four drive wheels, while allowing a progressive coupling of the sets with the engine, and it is moreover while this coupling is taking place that a potentially dangerous temperature rise of the actuator is observed.

By virtue of the method according to the invention, the control unit estimates the temperature of the actuator T° act estim when it is useful to do so, that is to say during the period of time when the actuator might be used and while there is no certainty that the control unit can be set to sleep mode without this presenting a potential danger to the actuator. With the method according to the invention, once the engine is stopped and is no longer generating engine torque likely to overheat the actuator, the electronic unit continues to estimate the trend of the temperature of the actuator before authorizing the switchover of the control unit to its sleep mode.

Thus, by virtue of the method according to the invention, the switchover of the control unit from the active operating mode to the sleep mode is performed if it is considered that the cooling of the actuator is sufficiently great for there to be no risk that this actuator is still overheated. The risk of reverting to a situation of overheating of the actuator in a subsequent use of the actuator following the switchover of the control unit to sleep mode is minimized.

If the switchover of the electronic control unit from its active operating mode to its sleep mode were authorized with the actuator overheated, there would then be a risk of reverting to the case where the user of the vehicle could decide to restart the engine (for example after a short stoppage of the engine, less than a minute), and reuse the actuator when it is still overheated, without the electronic control unit being able to detect this overheating. This is because the estimating of the temperature of the actuator that is required to detect an overheating of the actuator can sometimes take a long time to implement, notably when the control unit is leaving its sleep mode during which no estimation of the temperature could be performed. If the overheated actuator were reused by the electronic control unit while leaving its sleep mode there would be then a risk to the actuator. The invention makes it possible to reduce this risk by checking that the temperature of the actuator is below a stored temperature threshold before authorizing the switchover to sleep mode.

Observing the condition of the current estimated actuator temperature value "T° act estim" being less than or equal to a given temperature threshold "T° amb estim+Delta T°" to authorize the switchover to sleep mode necessarily requires this actuator, at the time of the next use of the actuator to mechanically couple the sets together, to have a temperature which will be:
  - either less than what it was at the time of the switchover of the electronic control unit to sleep mode,
  - or greater than what it was at the time of the switchover of the electronic control unit to sleep mode but while being at most equal to the ambient temperature around the vehicle (over the entire duration of the sleep mode, there is a priori no heat input linked to a transmission of torque by the actuator since the engine is not operating). The only heat input that might explain an increase in temperature of the actuator during the sleep mode is heat input by the environment of the vehicle (this input being insufficient for the actuator to be overheated at the time of the restarting of the engine) or by an abnormal use (for example: towing of the vehicle on two wheels).

In the context of nominal use, the temperature of the actuator at the time of its first reuse to couple the sets (that is to say after the electronic control unit has left its sleep mode and returned to the active operating mode) is therefore necessarily compatible with its correct operation.

By virtue of the method according to the invention, the risk of having an overheating of the actuator, caused by the return to active operating mode of the electronic control unit after its sleep mode, is therefore minimized.

Another advantage of the method according to the invention is that it can be used without having to use a clock to continue to estimate the trend of the temperature of the actuator during the phase during which the control unit is in sleep mode. With a clock, unlike the method according to the invention, it would be possible to evaluate the trend over time of the temperature of the actuator, which would make it possible to have an estimated actuator temperature value at the time of the return to active mode of the electronic control unit, but this solution would be costly to implement.

To sum up, the method according to the invention makes it possible to switch the electronic control unit to sleep mode at the right time so as to limit the energy consumption by this control unit (the consumption is reduced in sleep mode compared to the active operating mode) while ensuring that the actuator is sufficiently cooled so as not to present any additional risk of overheating upon its next use.

The terms and abbreviations used hereinbelow are given to facilitate the understanding of the present invention:

"Act": actuator;

"Application Shtdwn": is an application to switch off the electronic control unit of said actuator, this application comprises a set of steps (in this case, it concerns the functions: "Functs disbld", "Flsfe disbld", "CAN disbld") implemented to switch over this electronic control unit from its active operating mode, denoted "Run Mode", to its sleep mode, denoted "Slp Mode", this switchover being able to be done via a transitory mode called standby mode, denoted "Stdby Mode" (corresponding to the term "standby mode"). It should be noted that the desire here is to minimize the electrical consumption of the electronic control unit of said actuator while reducing the risk of overheating of the actuator which can occur if the user decides to restart his or her vehicle when this actuator is still hot;

"Btry": electrical power supply means for the control unit. In this case it is a battery linked to the electronic control unit to enable it to operate even when the signal "Ingnt Off" is generated (for example the signal "Ingnt Off" is generated when the contact is cut by the user using the contact key), that is to say when the power supply means of the actuator are deactivated and the engine of the vehicle is stopped (the battery is useful to allow power supply for the electronic control unit of the actuator in all its operating modes including in standby mode "Stdby Mode" or during the switchover from the active operating mode "Run Mode" to the standby mode "Stdby Mode", prior to the switchover to sleep mode "Slp Mode");

"CAN": communication network linking the electronic control unit of said actuator to at least one other electronic control unit of another device such as the devices managing the ignition of the engine of the vehicle or the device managing the braking of the vehicle or the device managing the air conditioning of the vehicle (CAN stands for "controller area network");

"disbld"=indicates that a function is not activated (for example Flsfe disbld=Flsfe function deactivated);

"enbld"=indicates that a function is activated ("enabled");

"EEPROM"=electrically erasable and programmable read-only memory;

"ETC"=electronic control unit of said actuator (known by the term "electronic torque controller");

"ETC Swtch"=control means actuated by the user, in this case it is a three-position control, linked to the electronic control unit ETC and designed to selectively transmit to this unit three types of signals which are selectively a first signal of the desire of the user to have only two drive wheels, a second signal of the desire of the user to have automated management of the mechanical coupling between the front and rear sets of the vehicle (in the case of an automatic coupling function ordered via this second signal, the control unit will take into account information representative of the slip of at least one wheel relative to the ground to decide whether there is or is not a need to couple the sets together, a third signal of the desire of the user to have four drive wheels, that is to say a desire for the front and rear sets of the vehicle to be coupled together by the actuator, in this case the electronic control unit orders the actuator to perform a coupling of the sets, provided that conditions as prerequisites are observed such as a current vehicle speed less than a given speed, for example the current speed should be less than 80 Km/h (this makes it possible to avoid a coupling at speeds that do not require any coupling, for example to reduce the fuel consumption it is possible to eliminate the coupling with vehicle speeds greater than 80 Km/h) and/or that the estimated temperature of the actuator is less than a predetermined maximum operating temperature threshold (this makes it possible to avoid a risk of overheating of the actuator);

"Flsfe": fail safe function (a failsafe function is a function for detecting/monitoring the correct operation of certain elements of the distribution device and which, in case of detection of a malfunction, generates a command which may, for example, order the initiation of degraded distribution device management modes);

"Funct": function

"HW": hardware, in the case of the engine torque distribution device, HW designates the mechanical or electromechanical elements of the system such as the actuator, or the electronic control unit of said actuator, or memories or batteries or the operation of communication between the electronic control unit of said actuator and the CAN;

"Init": initialization of the torque distribution device;

"Ignt": reactivation signal, which is a signal given when the user actuates, for example, the vehicle ignition key. The signal Ignt On indicates that the contact is made and the signal Ignt Off indicates that the contact is cut (Ignt is short for "ignition");

"Off": indicates that a function or an event is not detected/not implemented;

"On": indicates that a function or an event is detected/implemented;

"Pwrltch tmr Max": is a predetermined maximum time value for implementation of the Pwrltch function. In this case, this maximum time is 30 minutes. This maximum time value is used to compare it with the current time value t counted down via the function Tmr. Thus, if the equation denoted (t−Tmr)>Pwrltch tmr Max is true, then it is known that the time t measured by the function Tmr has exceeded the predetermined maximum time Pwrltch tmr Max for implementing the Pwrltch function. As indicated hereinbelow, when the function (t−Tmr)>Pwrltch tmr Max is satisfied, then the electronic control unit is ordered to switch over to a standby mode "Stdby" prior to the shutdown of the device denoted "Slp mode";

"RAM": random access memory;

"ROM": read-only memory;

"Run": indicates that a function is performed, being carried out;

"Run Mode": the electronic control unit of said actuator is in its active operating mode;

"Slp Mode": sleep mode of the electronic control unit of the actuator. In this mode, the electronic control unit remains inactive, its only function is to await a signal Ignt On (indicating the desire to start expressed by the user of the vehicle or the actual starting of the engine), and the electronic control unit consumes little or no electricity from its battery Btry (Slp stands for "Sleep");

"Swtch": three-position selector switch;

"Stdby Mode": standby mode of the electronic control unit of the actuator, this standby mode is a transitional mode during the switchover of the electronic unit from its active operating mode "Run Mode" to its sleep mode "Slp Mode". This standby mode is useful because it is used to write information such as the engine water temperature in at least one EEPROM and to test RAM and ROM memories of the torque distribution device before the electronic control unit of the actuator switches to sleep mode "Slp Mode";

"T° act estim": estimated temperature of the actuator (this abbreviation is used in the equation "T° act estim≤(T° amb estim+DeltaT°)" in which T° amb estim is the estimated temperature of the ambient air and Delta T° is a predetermined temperature value, preferably fixed and which is preferably chosen to be 20° C. When this equation "T° act estim≤(T° amb estim+Delta T°)" is satisfied, this means that the estimated temperature of the actuator has passed below a temperature threshold equal to the estimated temperature of the air plus the predetermined Delta value. This check is a condition for the switchover of the electronic control unit from its operating mode Run Mode to its standby mode denoted "Stby Mode";

"Tmr": elapsed time counting function, in this case the notation Tmr=t indicates that there is an elapsed time count t by the time counting function Tmr (Tmr is short for "Timer");

"Tst": test

"Wke Transit Mode": reactivation transitional mode allowing for the mode transition/change upon the switchover of the electronic control unit of said actuator from its sleep mode to its active operating mode denoted "Run Mode".

For the implementation of the method according to the invention, it is also possible to arrange, in the case where, if, after a predetermined and stored cooling time Pwrltch tmr Max, the electronic control unit does not satisfy the above-mentioned condition of current estimated actuator temperature value T° act estim being less than or equal to said given temperature threshold T° amb estim+Delta T°, for the electronic unit to then order its switchover from the active operating mode Run Mode to the sleep mode Slp Mode.

Thus, the switchover from the active operating mode Run Mode to the sleep mode Slp Mode is authorized by said control unit:

only when the engine is stopped, and if the estimated temperature of the actuator (T° act estim) less than or equal to said given temperature threshold (T° amb estim+Delta T°) or if a predetermined and stored cooling time delay (Pwrltch tmr Max) has elapsed since the stopping of the engine observed by the electronic control unit.

This embodiment of the method of the invention makes it possible to take into account the case where the electronic control unit does not manage to correctly estimate the actuator temperature value, because, in the context of normal use of the vehicle, once the engine is stopped during the predetermined cooling time delay, it has been observed that the temperature of the actuator ought necessarily to be less than the given temperature threshold (T° amb estim+Delta T°). Thus, if, after this predetermined cooling delay (Pwrltch tmr Max), the electronic control unit were not to verify that the estimated actuator temperature is less than or equal to the predetermined threshold, then it orders its switchover to sleep mode. This mode avoids an unnecessary energy consumption that the pointlessly continued actuator temperature estimation would entail.

To implement the previous embodiment of the invention, it is possible to arrange for said predetermined and stored cooling delay (Pwrltch tmr Max) to be chosen to be 30 minutes.

The duration of 30 minutes is chosen because it makes it possible to have a cooling of the actuator that is sufficient to allow for an almost immediate re-use of the actuator since it has been observed that, in a conventional environment of use of the vehicle, this actuator temperature is then between the ambient temperature T° amb of the vehicle and this ambient temperature T° amb estim+Delta T° in which Delta T° is a fixed and predetermined temperature differential. Thus, the estimated actuator temperature value at the time of the switchover of the control unit from its sleep mode to its active operating mode will necessarily be between the ambient temperature T° amb estim of the air measured by the temperature sensor and this ambient temperature T° amb estim plus the fixed value Delta T°, this value Delta T° being chosen between +10° C. and +30° C. and preferentially being +20° C.

In order to secure the actuator, it is arranged for the current estimated actuator temperature value at the time of the switchover of the control unit to active operating mode to be defined as being T° amb estim+Delta T° with the value of Delta T° preferentially being set at +20° C.

In order to implement the method according to the invention, it can also be arranged for the switchover of the electronic control unit from its sleep mode (Slp Mode) to its active operating mode (Run Mode) to be authorized by the electronic control unit only after it has received at least one so-called reactivation signal (Ignt On) and provided that it does not receive a stop signal (Ignt Off) between the moment of reception of the ignition signal (Ignt On) and the moment when the electronic control unit is in its active operating mode (Run Mode).

In this embodiment, the control unit can be passive throughout the sleep mode and consume no energy, its activation to active operating mode following the reception of a reactivation signal (Ignt On) generated by another system of the vehicle such as the engine starting system.

To implement the method according to the invention, it can also be arranged for said electromechanical actuator to be a friction clutch, and preferentially for this friction clutch to be a disk clutch and for said current estimated actuator temperature value (T° act estim n) to be estimated using a model that takes into account:

a first value proportionally variable to a speed of rotation of at least one part of the front set designed to be driven in rotation by the engine when the actuator is in the mechanical coupling configuration of the sets;

a second value, distinct from the first variable value, this second value being variable proportionally to a speed of rotation of at least one part of the rear set which is designed to be driven in rotation by the engine when the actuator is in the mechanical coupling configuration of the sets.

The first variable value can be an average of the speeds of rotation of the wheels of the front set and the second variable value can be average of the speeds of rotation of the wheels of the rear set. The method according to the invention helps to limit this temperature rise without in any way being obliged to measure the temperature of the actuator using a temperature sensor dedicated to the actuator.

For the implementation of the above embodiment of the method according to the invention, to estimate the trend over time of said current temperature value of said actuator (T° act estim n), in addition to said first and second values, it is possible to have the electronic control unit also take into account a past estimated temperature value (T° act estim n−1) of the actuator, and at least one value representative of an ambient temperature of the vehicle measured using a temperature sensor such as a sensor sensing air temperature outside the vehicle.

This embodiment makes it possible to deduce the trend of the temperature of the actuator without having to install a temperature sensor on this actuator and by only using other measurements representative:

of the specific overheating of the actuator because of its use to couple the sets (in this case, the first and second values representative of speeds of rotation of set elements);

of the ambient temperature of the environment of the vehicle which influences the cooling speed of the actuator.

To implement the method according to the invention, it is also possible to arrange for the vehicle to have, in addition to said electrical power supply means (Btry) of said electronic control unit, a main power supply circuit designed to distribute electricity to different elements of the vehicle, this said main power supply circuit and said electrical power supply means (Btry) being arranged so that said electrical power supply means (Btry) distributes electricity including when the main power supply circuit is not distributing electricity.

In this case, the main power supply circuit is preferentially designed to distribute electricity when the ignition signal (Ignt On) is present and is designed to not distribute electricity over a period extending between the emission of a stop signal (Ignt Off) and the emission of a new ignition signal (Ignt On). Also, said electrical power supply means (Btry) designed to power said electronic control unit is also designed to distribute energy to this control unit when the latter is in a mode other than its sleep mode (Slp Mode) and preferentially also when this control unit is in its sleep mode (Slp Mode), preferentially said electrical power supply means (Btry) is designed to permanently power said electronic control unit (ETC).

Preferentially, said actuator comprises a relay linked to the main power supply circuit in order to supply the actuator with current enabling its change of configuration, the relay being also linked to said electronic control unit, the relay being designed so that, on reception of a signal commanding a switchover to coupling configuration, the latter authorizes the passage of current from the main power supply circuit to windings of the actuator so that the latter switches to coupling configuration, the relay being also designed so that, on reception of a signal commanding a switchover to decoupling configuration, the latter cuts the current from the main power supply circuit to the windings of the actuator so that the latter switches to decoupling configuration.

For the implementation of the method according to any one of the abovementioned embodiments, it is possible, if the electronic control unit receives a stop signal (Ignt Off) representative of the stopping of the engine when the actuator is in its configuration of coupling the sets to said engine, and if, within a predetermined elapsed time to be counted from this reception of said stop signal (Ignt Off), the control unit receives a reactivation signal (Ignt On) representative of the operation of the engine, to have the electronic control unit reactivate said actuator in this same coupling configuration, the switchover of the control unit from its active operating mode to its sleep mode being prohibited by the electronic control unit at least until the end of the predetermined time, the duration of which is less than 5 minutes and preferentially greater than or equal to 1 minute.

This embodiment makes it possible:

on the one hand to store the coupling configuration for a predetermined time and to retain this coupling configuration in case of restarting of the engine; and on the other hand to delay the switchover of the electronic control unit from its active operating mode (Run Mode) to its sleep mode (Slp Mode) when the actuator is in the coupling configuration which allows for a quick restart without the coupling of the sets changing.

This mode is particularly useful in case of stalling of the engine in a situation where both sets are coupled to the engine as is the case when driving the vehicle on slippery or rough terrain. In such a case, by storing the coupling configuration and restarting by keeping this same configuration, it is possible to restart while remaining with both sets coupled so as to retain a distribution of the traction over the wheels of the two sets. Thus, in the event of a rapid restart of the engine, that is to say before the expiration of the predetermined time, the vehicle will keep its two sets coupled to the engine in the way in which they were coupled before the engine stalled. Thus, the risk of the vehicle being stuck in the event of a stall in a slippery area where the vehicle is running with both sets coupled is reduced.

In addition to the abovementioned embodiment, it is possible, in the case where the electronic control unit receives a stop signal (Ignt Off) representative of the stopping of the engine, to arrange for it to store the current configuration of said actuator and reactivate this same configuration if it receives an ignition signal (Ignt On) representative of the operation of the engine before the electronic control unit switches over to sleep mode.

With this embodiment, there is an assurance that the current configuration of the actuator is maintained as long as the electronic control unit has not switched over to sleep mode, thus making it possible to restart the engine without changing configuration.

For the implementation of the method according to the invention, it is also possible to organize the system so that, if, during said predetermined elapsed time to be counted from this reception of said stop signal (Ignt Off), the electronic control unit does not receive any ignition signal (Ignt On) representative of the operation of the engine, and if the electronic control unit authorizes its switchover to sleep mode then, after reception by the control unit in sleep mode of an ignition signal (Ignt On) representative of the operation of the engine, the electronic control unit generates an actuator command signal, ordering the switchover or maintaining of said actuator to or in its decoupling configuration.

This embodiment makes it possible to minimize the usage of the vehicle with its two sets coupled, because this usage is more energy-consuming. By virtue of this embodiment of the method according to the invention, the usage of the coupling of the two sets to the engine is thus limited to only the strictly necessary situations (for example situations detected by the vehicle if the selection of the configuration is in auto mode, that is to say if the choice is left by the user to the electronic control unit alone) or when the user of the vehicle wants to force this usage with a plurality of sets coupled.

BRIEF DESCRIPTION OF THE DRAWINGS

Other features and advantages of the invention will become more clearly apparent from the description given below, as an indicative and nonlimiting example, with reference to the appended drawings, in which.

DETAILED DESCRIPTION

As stated previously, the invention relates to a method for managing a device for distributing torque between front and rear wheel sets of a vehicle.

Figure 1:
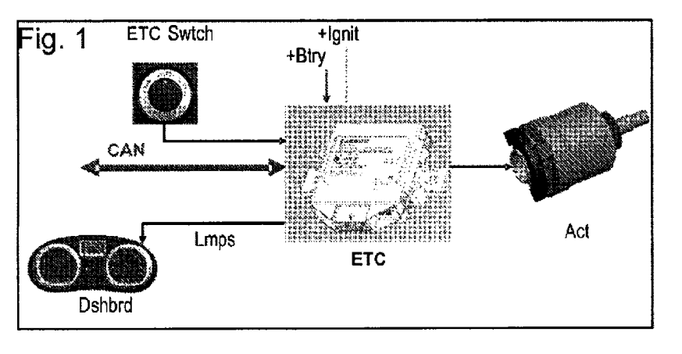
FIG. 1 represents a device for distributing torque between front and rear wheel sets of a vehicle making it possible to implement the method according to the invention (the front and rear sets of the vehicle are not represented, but the actuator ACT can be seen)

As can be seen in FIG. 1, the engine torque distribution device which belongs to a vehicle comprises an electromechanical actuator Act, in this case the actuator comprises a disk clutch for which the clutch positions are chosen electrically according to an actuator control signal transmitted by an electronic control unit ETC.

The actuator Act makes it possible to selectively couple or decouple the wheel sets of the vehicle in relation to the engine and one relative to the other depending on whether the aim is to distribute the driving force over one or more wheel sets (two drive wheels or four drive wheels).

The electronic control unit ETC is linked to a number of elements, comprising:
vehicle ambient air temperature sensors for measuring/estimating an ambient temperature of the vehicle "T° amb estim", the link to these sensors being able to made via a communication network "CAN";
a sensor of the input of the user "ETC Swtch" (described hereinbelow);
a battery "Btry" for permanently supplying energy to the ETC;
a connection enabling the ETC to receive the ignition signal Ingt On representative of the operation of the engine and the stop signal Ignt Off representative of the stopping of the engine or at least the will of the user to stop the operation of the engine;
a connection making it possible to transmit, to a dashboard of the vehicle, information relating to the current state of operation of the coupling device such as the coupling or the decoupling of the wheel sets or the current operating mode of the ETC (run mode or sleep mode) or the current state of the actuator Act which may be overheating or not.

The sensor of the will of the user "ETC Swtch" is a selector that can move between 3 selective positions, comprising:
a decoupled position expressing the will to have a vehicle operating as a vehicle with only one drive set, that is to say with two drive wheels;
a coupled position, expressing the will to have the two sets coupled and consequently a vehicle operating in four drive wheel mode; and
an intermediate position, called automatic, expressing the will of the user to allow the electronic control unit ETC to automatically choose the coupling or the decoupling of the sets according to the vehicle running mode (that is to say, according to rules for the selection of the configurations of coupling and of decoupling of the actuator according to the speed of the vehicle and the differential slip of the wheels measured by wheel rotation sensors).

This selector (i.e., ETC switch) has a physically stable position in automatic mode, though the coupling position is an unstable position in order to deactivate the coupling in running situations where it is not necessary.

The action for distributing said engine torque between said sets is designed to adopt selectively, on the basis of control signals sent by the ETC, a configuration of mechanical coupling of the sets and a configuration of mechanical decoupling of the sets.

The electronic control unit of said actuator is provided with one or more memories of EEPROM, RAM and ROM type and is designed to control, by at least one actuator control signal, the switchover of said actuator to at least one of said coupling and decoupling configurations and, possibly, to adopt intermediate configurations.

It is the electronic control unit, based on information transmitted by the sensors and in particular according to the position of the selector ETC Swtch, which determines the configuration that the actuator Act has to adopt.

As indicated previously, the actuator has a tendency to heat up when it is being used to couple said wheel sets to the engine.

To reduce the risk of using the actuator when it is in an overheating situation, the electronic control unit ETC estimates a current value representative of the temperature "T° act estim" of the actuator Act. This estimation is made using an algorithm that takes into account a rotation speed differential of elements of the front and rear sets and an ambient air temperature measured with a sensor T° amb estim (in this case, the algorithm takes into account the first and second values which are respectively proportional to the abovementioned rotation speeds).

Figure 2:
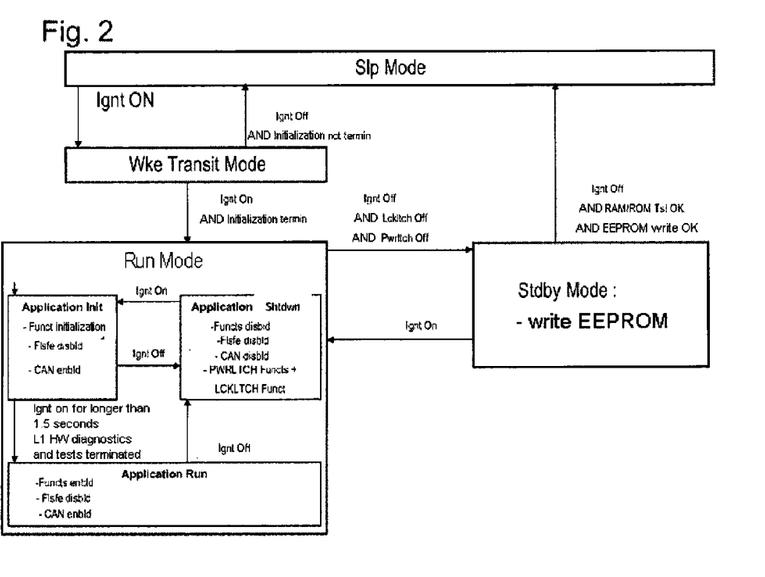
FIG. 2 represents the different operating modes of the electronic control unit as well as the conditions required for the changes of mode (in accordance with the method according to the invention) and a description of the particular applications and functions executed by the control unit ETC for each of its modes.

As can be seen in FIG. 2, in active operation Run Mode, the control unit can operate in Application Run mode, which is the mode used when the vehicle is running. In this application, the ETC performs functions Functs enbld which consist in particular in generating at least one so-called control signal of said actuator. The performance of these functions consumes energy from the battery Btry in particular because of the operations of calculating and estimating the temperature of the actuator.

To reduce this consumption, a sleep mode Slp Mode of said control unit has been defined, in which it no longer estimates the temperature of the actuator, does not generate any actuator control signal and performs fewer or no calculation operations.

The method according to the invention manages the switchovers between these modes.

Thus, to switch over from the sleep mode Slp mode to the active operating mode Run Mode, there is an intermediate transitional mode denoted Wke Transit Mode. In this mode Wke Transit Mode, the ETC performs only electronic tests on its components such as its memories.

The switchover from the sleep mode Slp Mode to the transitional mode Wke Transit Mode is initiated when the ETC receives a make contact signal Ignt On. If, while the test in transitional mode Wke Transit Mode is being performed, an Ignt Off signal arrives at the ETC, then the latter interrupts its operation in transitional mode and reverts to the sleep mode Slp Mode.

If all the tests performed during the transitional mode Wke Transit Mode are performed correctly in time, the message Initialization termin is generated and if the engine starting signal Ignt On is still present, then the ETC switches to active operating mode Run Mode and more particularly to the application Init for initializing the active operating mode Run Mode. In this application, the ETC performs initialization functions "Funct initialization" consisting, for example, in testing the connection to the actuator and the operation of the actuator and in testing other elements such as the selector ETC Swtch and the communication network CAN. These are tests and diagnostics of the hardware HW. In this application, the error detection functions Flsfe disbld are deactivated. The functions Flsfe are functions enabling the device to continue to operate in a degraded mode when failures have been observed. Here, these functions Flsfe are deactivated at the time of the application Init to avoid having errors that do not truly exist being detected and degraded operating modes Flsfe being launched with no real need.

If an Ignt Off signal arrives at the ETC during this application Init, then the ETC switches to the application Shtdwn which still belongs to the Run Mode. In the application Shtdwn, the steps of the method according to the invention are implemented that consist in delaying the switchover to sleep mode of the ETC by waiting either for a predetermined time of at most 30 minutes to elapse or for the estimated temperature of the actuator T° act estim to be less than or equal to T° amb estim+Delta T° (in this case, Delta T° is always 20° C.). These time delay operations are denoted PWRLTCH functions and are described in detail in FIG. 3.

By contrast, if the application Init runs correctly within a predetermined time, in this case less than 1.5 seconds, and if no Ignt Off signal reaches the ETC during this application Init and if the signal Ignt On is still present, then the ETC switches to Run application.

In this Run application, the functions of controlling the actuator, of estimating the temperature of the actuator Act and the functions Flsfe are activated as is the communication with the network CAN. The ETC executes this Run application as long as it does not receive any signal Ignt Off. In case of reception of the signal Ignt Off while the ETC is executing the Run application, the ETC switches over to the Shtdwn application, called shutdown application.

It should be noted that, when the ETC executes the shutdown application Shtdwn, the ETC can switch back to the initialization application, application Init, if it receives a signal Ignt On. In this case, the initialization resumes and if the signal Ignt On remains present, the ETC returns to the execution of application Run.

It should be noted that, when the ETC enters into its application Run, when it comes from its sleep mode, it is arranged for the first estimated actuator temperature value T° act estim to be equal to T° amb estim+Delta T° where T° amb estim is the temperature of the air measured by a temperature sensor communicating with the ETC (the communication may be direct without involving the CAN network) and where Delta T° is equal to 20° C.

Consequently, at an instant n, this estimated actuator temperature value T° act estim is regularly re-estimated by using the abovementioned algorithm which determines the heat input to the actuator by the rotation speed differentials of the sets and by its estimated temperature at a past instant n−1.

This estimation of trend of the actuator temperature is performed during the application Run and also during the application Shtdwn, which makes it possible, in case of return to the application Init, to have an actuator temperature value evaluated without there having been any interruption in the evaluation. The risks of error in evaluating this actuator temperature are thus minimized.

During the execution of the application Shtdwn, a function LCKLTCH Funct is executed by the ETC, such function consisting in storing the current configuration of the actuator and in checking that, in case of a return of the ETC to application Run, within a delay of approximately 1 minute, the latter makes the current configuration of the actuator remain unchanged and in particular if this current configuration is the coupled configuration. As explained previously, this function LCKLTCH Funct covers the cases of restart after a stall when the vehicle is driving with the two sets coupled (4*4 driving). After this abovementioned delay of approximately 1 minute, the function LCKLTCH Funct switches to deactivated and is denoted LCKLTCH Funct Off.

Figure 3:
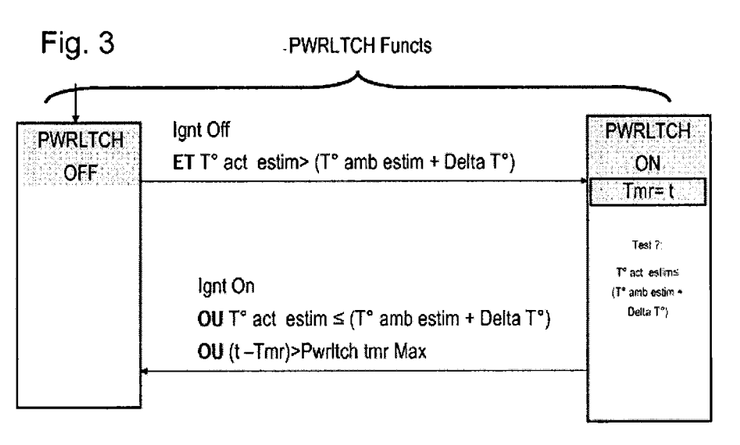
FIG. 3 is a figure detailing the PWRLTCH function which is the function that makes it possible to implement some of the conditions of the method according to the invention prior to the switchover of the control unit ETC from its active operating mode Run Mode to its sleep mode Slp Mode.

The function PWRLTCH Fumets consists in continuing to evaluate the current temperature of the actuator during the application Shtdwn and in counting down the time t using a counter Tmr until a predetermined and stored delay Pwrltch Max is reached. In a first stage, as long as the estimated temperature of the actuator is greater than T° amb estim+Delta T° and the signal Ignt Off is present, a signal PWRLTCH ON is maintained. If, in a second stage, after the predetermined delay Pwrltch Max, in this case 30 minutes, there is still a current estimated actuator temperature which is greater than T° amb estim+Delta T°, then t−Tmr>Pwrltch Max and the ETC transmits a signal PWRLTCH Off.

Similarly, if the estimated temperature of the actuator becomes less than or equal to T° amb estim+Delta T°, or there is a signal Ignt On during the execution of the application Shtdwn, then the ETC transmits a signal PWRLTCH OFF.

If Ignt Off and LCKLTCH Off and PWRLTCH Off are present simultaneously and the ETC is in Run mode, then the ETC orders its switchover to an intermediate mode (between the Run mode and its Slp mode). This intermediate mode is denoted Stdby Mode. In this mode, the ETC checks that it is possible to read and write information in its EEPROM memories and enters information therein, such as the water temperature of the vehicle cooling system. Once this information has been written in the EEPROM, the ETC switches over to Slp mode which consumes little or no energy.

If the ETC in Stdby mode receives a signal Ignt On, then it returns to its Run mode and executes the application Init, and if this signal Ignt On persists during the application Init, then the ETC reverts to its application Run.

The engine stopped condition is checked by the electronic control unit using at least some of the signals from some of said sensors.

In this case, the electronic control unit considers that the engine stopped condition is effective when it receives said stop signal (Ignt Off) and does not receive a reactivation signal (Ignt On).

When the current estimated temperature of the actuator Act passes below the given temperature threshold, T° amb estim+ Delta T°, it is considered that the electronic control unit can switch over to sleep mode and therefore stop the operation of estimating the trend of the current temperature which consumes little or no energy without this constituting a risk to the future correct operation of the actuator.

In practice, without such a function which makes it possible to check the correct cooling of the actuator before authorizing the switchover to sleep mode Slp Mode, there would be a risk of overheating of the actuator upon its next use. This risk exists when the actuator is used to mechanically couple the front and rear sets of the vehicle when it is already overheated, or if the electronic control unit was set to sleep mode Slp Mode without previously checking that the temperature of the actuator T° Act estim is sufficiently low (in this case less than or equal to the given temperature threshold: T° amb estim+Delta T°), there would be a risk in case of a new use occurring before the actuator is sufficiently cooled.

The invention claimed is:

1. A system for managing distribution of engine torque of an engine between front and rear wheel sets of a vehicle, the system comprising:
    an electromechanical actuator to distribute the engine torque between the front and rear wheel sets, and to selectively adopt a mechanical coupling configuration of the front and rear wheel sets and a mechanical decoupling configuration of the front and rear wheel sets;
    an electronic control unit including a memory to control, using at least one actuator control signal, switching of the electromechanical actuator to at least one of the coupling and decoupling configurations;
    an electrical power supply to supply power to the electronic control unit; and
    a plurality of sensors to transmit to the electronic control unit a plurality of sensor signals, including at least an ignition signal representative of operation of the engine and a stop signal representative of stopping of the engine and measurements of physical parameters or temperature of ambient air,
    wherein the electronic control unit is configured:
        to adopt an active operating mode in which the electronic control unit generates at least one control signal for the electromechanical actuator and, using at least some of the measurements of physical parameters, estimates a current actuator temperature value; and
        to adopt a sleep mode in which the electronic control unit retains information in the memory, and in which the electronic control unit does not generate the at least one actuator control signal and does not estimate the current actuator temperature value, the electrical energy consumption of the electronic control unit being higher in the active operating mode as compared to that in the sleep mode,
    wherein switchover from the active operating mode to the sleep mode is authorized by the electronic control unit:
        when the engine is stopped, and
        when the estimated current actuator temperature value is less than or equal to a predetermined temperature threshold, and
    wherein switchover from the sleep mode to the active operating mode is authorized by the electronic control unit after the electronic control unit has received at least one of the ignition signal and provided that the electronic control unit does not receive the stop signal between a moment of reception of the ignition signal and a moment when the electronic control unit is in the active operating mode.

2. The system as claimed in claim 1, wherein after a predetermined and stored cooling delay, the electronic control unit does not check whether the estimated current actuator temperature value is less than or equal to the predetermined temperature threshold when the electronic unit authorizes the switchover from the active operating mode to the sleep mode.

3. The system as claimed in claim 2, wherein the predetermined and stored cooling delay is 30 minutes.

4. The system as claimed in claim 1,
    wherein the electromechanical actuator is one of a friction clutch and a disk clutch, and
    wherein the estimated current actuator temperature value is estimated using a model taking into account:
        a first value proportionally variable to a speed of rotation of at least one part of the front wheel set to be driven in rotation by the engine when the electromechanical actuator is in the mechanical coupling configuration of the front and rear wheel sets, and
        a second value, distinct from the first proportionally variable value, the second value being proportionally variable to a speed of rotation of at least one part of the rear wheel set to be driven in rotation by the engine when the electromechanical actuator is in the mechanical coupling configuration of the front and rear wheel sets.

5. The system as claimed in claim 4, wherein, to estimate a trend over time of the estimated current temperature value of the electromechanical actuator, in addition to the first and second proportionally variable values, the electronic control unit takes into account a past estimated actuator temperature value, and at least one value representative of an ambient temperature of the vehicle measured using a temperature sensor or a sensor sensing air temperature outside the vehicle.

6. The system as claimed in claim 1, wherein the system further comprises a main power supply circuit to distribute electricity to different elements of the vehicle, the main power supply circuit and the electrical power supply being configured so that the electrical power supply distributes electricity when the main power supply circuit is not distributing electricity.

7. The system as claimed in claim 1, wherein, when the electronic control unit receives the stop signal representative of the stopping of the engine when the electromechanical actuator is in its configuration of coupling the front and rear wheel sets to the engine, and when, within a predetermined elapsed time to be counted from reception of the stop signal, the control unit receives a reactivation signal representative of the switching on of the vehicle, then the electronic control unit keeps the electromechanical actuator in this same coupling configuration, with the switchover of the control unit from the active operating mode to the sleep mode being prohibited by the electronic control unit at least until the end of the predetermined elapsed time, the duration of which is less than 5 minutes, or is less than 5 minutes and greater than or equal to 1 minute.

8. The system as claimed in claim 7, wherein, when, during the predetermined elapsed time to be counted from reception of the stop signal, the electronic control unit does not receive any ignition signal representative of the operation of the engine, and when the electronic control unit authorizes the switchover to the sleep mode then, after reception by the control unit in the sleep mode of the ignition signal representative of the operation of the engine, the electronic control unit generates an actuator command signal, ordering the switchover or the maintaining of the electromechanical actuator to or in its decoupling configuration, respectively.

9. A method for managing a device for distributing engine torque of an engine between front and rear wheel sets of a vehicle, the method comprising:
    selectively adopting one of a mechanical coupling configuration of the front and rear wheel sets and a mechanical decoupling configuration of the front and rear wheel sets using an electromechanical actuator associated with the device;
    controlling switching of the electromechanical actuator to at least one of the coupling and decoupling configurations using at least one actuator control signal from an electronic control unit of the device;
    receiving a plurality of sensor signals at the electronic control unit, the sensor signals including one of an ignition signal representative of operation of an engine and a stop signal representative of stopping of the engine and one or more of measurements of physical parameters of the vehicle and temperature of ambient air surrounding the vehicle; and
    switching from an active operating mode of the electronic control unit to a sleep mode of the electronic control unit when the engine is stopped and when an estimated current actuator temperature value is less than or equal to a predetermined temperature threshold,
    wherein, in the active operating mode the electronic control unit generates at least one control signal for the electromechanical actuator and estimates the current actuator temperature value,
    wherein, in the sleep mode the electronic control unit retains information in memory, does not generate the at least one actuator control signal and does not estimate the current actuator temperature value,
    wherein electrical energy consumption of the electronic control unit is greater in the active operating mode than electrical energy consumption of the electronic control unit in the sleep mode, and
    wherein switchover from the sleep mode to the active operating mode is authorized by the electronic control unit after the electronic control unit has received at least one of the ignition signal and provided that the electronic control unit does not receive the stop signal between a moment of reception of the ignition signal and a moment when the electronic control unit is in the active operating mode.

10. The method as claimed in claim 9, further comprising, after a predetermined and stored cooling delay, not checking by the electronic control unit whether the estimated current actuator temperature value is less than or equal to the predetermined temperature threshold upon authorization of the switchover from the active operating mode to the sleep mode.

11. The method as claimed in claim 10, wherein the predetermined and stored cooling delay is 30 minutes.

12. The method as claimed in claim 9,
    wherein the electromechanical actuator is a friction clutch, and
    wherein the current estimated actuator temperature value is estimated using a model taking into account:
    a first value proportionally variable to a speed of rotation of at least one part of the front wheel set to be driven in rotation by the engine when the electromechanical actuator is in the mechanical coupling configuration of the front and rear wheel sets, and
    a second value, distinct from the first proportionally variable value, the second value being proportionally variable to a speed of rotation of at least one part of the rear wheel set to be driven in rotation by the engine when the electromechanical actuator is in the mechanical coupling configuration of the front and rear wheel sets.

13. The method as claimed in claim 12, further comprising estimating a trend over time of the estimated current temperature value of the electromechanical actuator, said estimating the trend being based on, in addition to the first and second proportionally variable values, a past estimated actuator temperature value and at least one value representative of an ambient temperature of the vehicle measured using a temperature sensor or a sensor sensing air temperature outside the vehicle.

14. The method as claimed in claim 9, further comprising:
    distributing electricity to different elements of the vehicle using a main power supply circuit; and
    distributing electricity to the electronic control unit using an electrical power supply different from said main power supply circuit,
    wherein said distributing electricity to the electronic control unit using the electrical power supply occurs when said distributing electricity to the different elements of the vehicle using the main power supply circuit does not occur.

15. The method as claimed in claim 9, further comprising:
    receiving the stop signal representative of the stopping of the engine when the electromechanical actuator is in its configuration of coupling the front and rear wheel sets to the engine; and
    when the stop signal representative of the stopping of the engine is received when the electromechanical actuator is in its configuration of coupling the front and rear wheel sets to the engine, and when, within a predetermined elapsed time to be counted from reception of the stop signal, the control unit receives a reactivation signal representative of the switching on of the vehicle, keeping the electromechanical actuator in this same coupling configuration, and prohibiting the switchover from the active operating mode to the sleep mode unit at least until the end of the predetermined elapsed time.

16. The method as claimed in claim 15, wherein, when, during the predetermined elapsed time to be counted from reception of the stop signal, the electronic control unit does not receive any ignition signal representative of the operation of the engine, and when the switchover to the sleep mode is authorized, after reception by the control unit in the sleep mode of the ignition signal representative of the operation of the engine, generating an actuator command signal and ordering the switchover or the maintaining of the electromechanical actuator to or in its decoupling configuration, respectively, based on the generated actuator command signal.

* * * * *